(12) United States Patent
Behnke et al.

(10) Patent No.: US 7,654,141 B2
(45) Date of Patent: Feb. 2, 2010

(54) DEVICE AND A METHOD FOR THE DETECTION OF STRUCTURE-BORNE ACOUSTIC VIBRATIONS

(75) Inventors: Willi Behnke, Steinhagen (DE); Markus Brune, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 298 days.

(21) Appl. No.: 11/508,677

(22) Filed: Aug. 23, 2006

(65) Prior Publication Data

US 2007/0062288 A1     Mar. 22, 2007

(30) Foreign Application Priority Data

Sep. 2, 2005   (DE) ....................... 10 2005 042 049

(51) Int. Cl.
     *G01H 17/00*    (2006.01)
(52) U.S. Cl. .......................................... 73/584; 73/597
(58) Field of Classification Search .................. 73/584, 73/592, 597; 56/10.2 R, 10.2 J
See application file for complete search history.

(56) References Cited

U.S. PATENT DOCUMENTS

| | | | | |
|---|---|---|---|---|
| 4,036,065 A | * | 7/1977 | Strelioff et al. ............ | 73/865.9 |
| 4,275,546 A | * | 6/1981 | Bohman et al. ............... | 460/2 |
| 5,800,262 A | * | 9/1998 | Andersen et al. .............. | 460/6 |
| 5,987,990 A | * | 11/1999 | Worthington et al. ......... | 73/592 |
| 6,146,268 A | | 11/2000 | Behnke et al. | |
| 6,839,616 B2 | * | 1/2005 | Beck ........................... | 701/50 |
| 6,874,304 B2 | * | 4/2005 | Clauss ..................... | 56/10.2 R |
| 7,415,365 B2 | * | 8/2008 | Jeppe .......................... | 702/56 |

FOREIGN PATENT DOCUMENTS

DE     197 25 028     12/1998

* cited by examiner

*Primary Examiner*—Hezron Williams
*Assistant Examiner*—Nashmiya S Fayyaz
(74) *Attorney, Agent, or Firm*—Michael J. Striker

(57) ABSTRACT

In a method and a device for the detection of at least one structure-borne acoustic vibration in a component of an agricultural harvesting machine, a timer is used to determine a transit-time difference of a structure-borne acoustic vibration that is received by at least a first structure-borne sound sensor and at least a second structure-borne sound sensor and, based on the transit-time difference, a source of the structure-borne acoustic vibration is determined, thereby enabling the location of the pulses triggering the structure-borne acoustic vibration to be identified.

19 Claims, 3 Drawing Sheets

DEVICE AND A METHOD FOR THE DETECTION OF STRUCTURE-BORNE ACOUSTIC VIBRATIONS

CROSS-REFERENCE TO A RELATED APPLICATION

The invention described and claimed hereinbelow is also described in German Patent Application DE 10 2005 042 049.4 filed on Sep. 9, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method and a device for the detection of structure-borne acoustic vibrations in a component of an agricultural harvesting machine.

Publication DE 197 25 028 makes known a sensor for determining structure-borne acoustic vibrations produced when grains strike a pulse detector. The sensor is composed of a plate-shaped pulse detector that extends across nearly the entire width of the separating or threshing part, on the underside of which a vibration sensor is located that is directly connected with an evaluation unit. The vibrations produced when the grains strike the pulse detector are introduced directly into the vibration sensor and cause it to produce voltage that is proportionally dependent on the vibrations, the voltage being transmitted to evaluation electronics, where it is evaluated. The vibrations produced by the grains are dependent on the number of grains that strike the pulse detector. It is therefore possible to use the pulse detector to determine the quantity of grain that strikes the pulse detector at a certain point in time or over a period of time.

The disadvantage of this sensor is the fact that the impact sites of the grains cannot be located.

SUMMARY OF THE INVENTION

The object of the present invention, therefore, is to avoid the disadvantages of the related art and, in particular, to provide a device and a method with which the impact sites of the grains on the pulse detector can be located.

In keeping with these objects and with others which will become apparent hereinafter, one feature of the present invention resides, briefly stated, in a method for detecting at least one structure-borne acoustic vibration in a component of an agricultural harvesting machine, comprising the steps of determining a transit-time difference of a structure-borne acoustic vibration that is received by at least a first structure-borne sound sensor and at least a second structure-borne sound sensor by using a timer; and based on the transit-time difference, determining a source of the structure-borne acoustic vibration.

Due to the fact that, using at least one timer, a transit-time difference of a structure-borne acoustic vibration is determined that is received by at least a first structure-borne sound sensor and at least a second structure-borne sound sensor, and due to the fact that the transit-time difference is used to determine a source of the structure-borne acoustic vibration, the distribution of the grains striking the pulse detector across the working width of the combine harvester can be determined.

Advantageously, the timer starts as soon as one of the structure-borne sound sensors receives the structure-borne acoustic vibration, and the timer stops as soon as both structure-borne sound sensors receive the structure-borne acoustic vibration, thereby making it possible to measure the transit-time difference very precisely and automatically.

A simple design of the inventive method results when the transit-time difference and a specified maximum possible transit time are used to calculate at least one transit time required for the structure-borne acoustic vibration to travel from its source until it is received by the first or the further structure-borne sound sensor.

A particularly advantageous design of the inventive method results when the calculated transit time and a specified sound velocity are used to calculate the distance between the source of the acoustic vibration and the structure-borne sound sensor, and when the distance indicates the source of the acoustic vibration in the component; this makes it possible to easily calculate the location of the pulse source that triggers the structure-borne acoustic vibration on the component.

Due to the fact that the timer is started when the sound pressure of the structure-borne acoustic vibration received by the structure-borne sound sensor exceeds a specified peak sound pressure, the measurement is limited to a selection of structure-borne acoustic vibrations that are triggered, e.g., by a certain pulse source.

Since, in practical use, the measured transit-time difference can never be greater than the maximum possible transit time required to travel the distance between the structure-borne sound sensors, the determination of the transit-time difference is halted when the transit-time difference measured by the timer reaches or exceeds the maximum possible transit time.

To ensure that the method is not hindered by disturbing pulses, the determination of the transit-time difference is halted and the timer is reset when the sound pressure from the structure-borne acoustic vibration falls below the specified peak sound pressure.

Advantageously, the distances between the source of the structure-borne acoustic vibrations and the structure-borne sound sensor are stored, in the control and evaluation unit, with the time when the associated transit-time difference was determined, in order to document the point in time when and the location on the component where the structure-borne acoustic vibration was triggered.

In order to determine the point on the component at which, e.g., numerous sources occur, the control and evaluation unit determines a distribution of the sources of the structure-borne acoustic vibrations in the component over a specifiable time period.

When the determination of the transit-time difference is started when the structure-borne sound sensors do not receive a structure-borne acoustic vibration, the timer can be triggered by the structure-borne sound sensors.

A particularly simple design of the inventive method results when the component includes at least a first structure-borne sound sensor and at least a second structure-borne sound sensor for measuring a structure-borne acoustic vibration, at least one timer for determining the transit-time difference of the structure-borne acoustic vibration received by the first and second structure-borne sound sensors, and a control and evaluation unit for determining the source of the structure-borne acoustic vibration as a function of the transit-time difference.

Due to the fact that the sensors are separated by a distance on the component, the location of a pulse source can be determined easily by measuring the transit-time difference.

In a particularly advantageous embodiment of the inventive device, the structure-borne sound sensors are located at the ends of the component, thereby ensuring that the resultant maximum possible transit time is as great as possible.

Advantageously, the structure-borne sound sensors are connected with the control and evaluation unit, thereby enabling the sound pressure of the structure-borne acoustic vibrations to be monitored.

To ensure that the timer is actuated automatically, the timer is connected with the control and evaluation unit.

In a first embodiment of the inventive device, the agricultural harvesting machine is designed as a combine harvester, and the component is a pulse detector for determining the separation of a stream of crop material.

In an advantageous embodiment of the present invention, the pulse detector extends across the working width of a working unit of the combine harvester, and the pulse detector detects a point of impact of a grain in the direction of the working width of the working unit, thereby enabling the points of impact to be used to determine the separation of the crop material across the width of the working unit.

Due to the fact that the sum of the two sound pressures produced by the structure-borne sound sensors are compared with a limiting sound pressure in the control and evaluation unit, it can be determined whether the acoustic vibration was triggered by a grain striking the pulse detector or by a non-grain component striking a structure-borne sound sensor directly.

To identify contamination of the pulse detector, the sound pressures of at least two structure-borne acoustic vibrations that have the same source and that are detected by a structure-borne sound sensor are compared with each other in the control and evaluation unit and, by comparing the sound pressures, a difference in the dampening of the structure-borne acoustic vibration is determined by the pulse detector.

Due to the fact that, when the dampening of the structure-borne acoustic vibration remains constant, the pulse detector compares the sound pressures of at least two structure-borne acoustic vibrations that have the same source and that are detected by the structure-borne sound sensors, it is possible to deduce the properties of the element triggering the structure-borne acoustic vibration.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
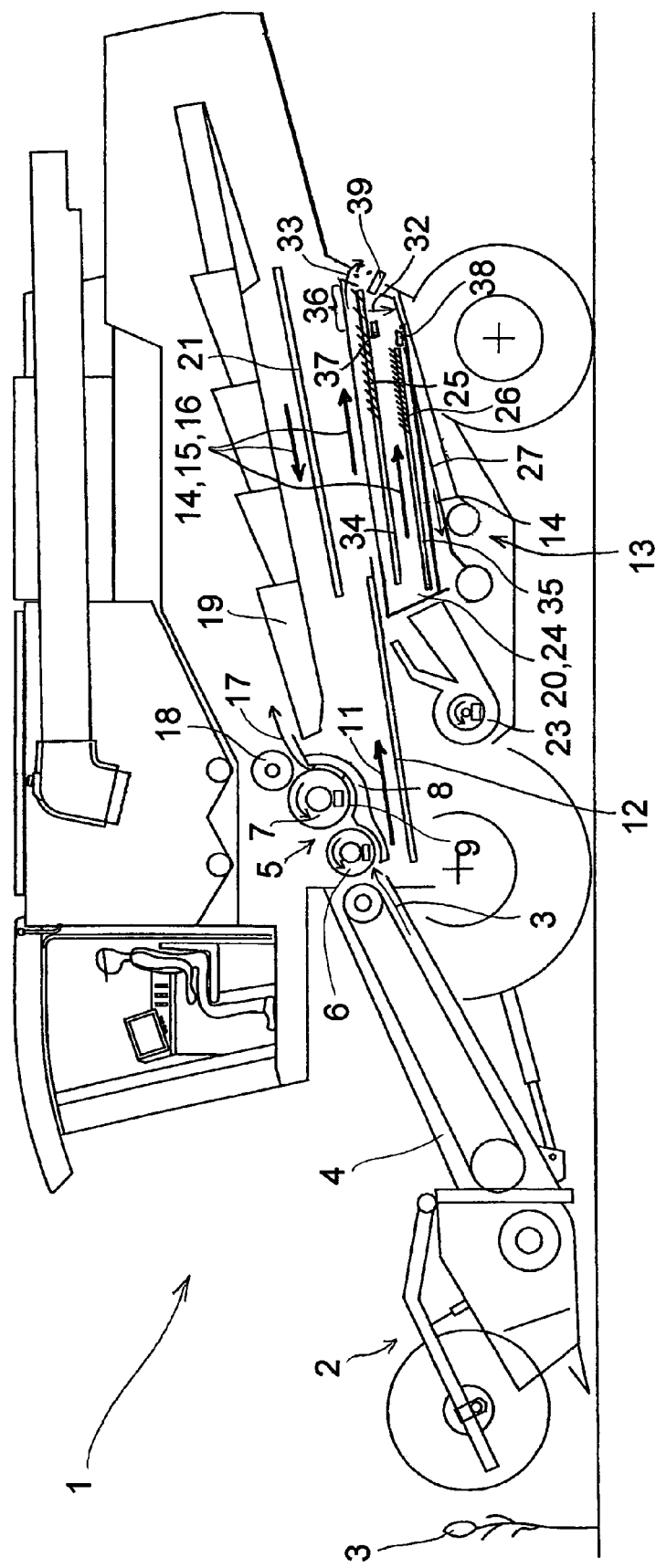
FIG. 1 shows a side view of a combine harvester in which an inventive method and an inventive device for detection of at least one structure-borne acoustic vibration are utilized.

The exemplary embodiment of the present invention shown in FIG. 1 is an agricultural harvesting machine designed as a self-propelled combine harvester 1 with a tangential threshing mechanism 5 and a downstream tray-type shaker 19. A cleaning unit 13 is located below tray-type shaker 19. The present invention is expressly not limited to these types of combine harvesters.

The mode of operation of a combine harvester 1 of this type will be described below. Crop material 3 is initially taken up by header 2, which conveys crop material 3 to a feed rake 4. Feed rake 4 transfers crop material 3, in its rear region, to threshing parts 6, 7, 8 of tangential threshing mechanism 5.

A pre-acceleration drum 6 that is downstream from a cylinder 7 in the direction of material flow is located at the entrance of tangential threshing mechanism 5. On the bottom, pre-acceleration drum 6 and cylinder 7 are at least partially enclosed by a concave 8.

Crop material 3 exiting feed rake 4 is caught by pre-acceleration drum 6 and pulled further by cylinder 7 through threshing gap 9 between cylinder 7 and concave 8. Cylinder 7 processes crop material 3 mechanically, then a grain-chaff mixture 11 is separated at concave 8 and guided to cleaning unit 13 via a grain pan 12—which is driven in an oscillating manner—in order to separate the grains from the admixtures, i.e., stalk and chaff parts.

From threshing mechanism 5, material flow 17—which is composed mainly of threshed stalks—is conveyed via counterclockwise-rotating impeller 18 to tray-type shaker 19, which conveys material flow 17 into the rear region of combine harvester 1. Any grains 14 still present in material flow 17 and any short straw 15 and chaff 16 are separated out by falling through tray-type shaker 19 to a return pan 21. Return pan 21 transports grain 14, short straw 15 and chaff 16 to grain pan 12. Grain 14, short straw 15 and chaff 16 also ultimately reach cleaning unit 13 via grain pan 12.

Cleaning unit 13 is composed of a blower 23 and a feed and cleaning device 20 designed as a sieve pan 24. Sieve pan 24 is composed of an upper sieve 25, a lower sieve 26, and grain return pan 27.

The separation of crop material 14, 15, 16, i.e., the separation of grain 14 from short straw 15 and chaff 16, takes place such that a flow of air is conveyed through sieve openings 34, 35 in upper sieve 25 and in lower sieve 26 from the bottom upward by blower 23, the flow of air loosening the flow of crop material that is conveyed via sieves 25, 26 into the rear region of combine harvester 1 and ensuring that the specifically lighterweight chaff and short-straw portions 15, 16 are separated out, while heavy harvested grains 14 fall through sieve openings 34, 35. Sieves 25, 26 are located such that they partially overlap, so that crop material 14, 15, 16 is sifted with different levels of fineness at two levels, it being possible to adjust sieve openings 34, 35 of sieves 25, 26 using actuators 57, 58. Upper sieve 25 is usually designed such that it has a larger mesh size in its rear region, i.e., the tailings region 36.

A component that is designed according to the present invention as a pulse detector 39 is located at the end of upper sieve 25. Pulse detector 39 extends across the working width of upper sieve 25.

The harvested grains that strike pulse detector 39 induce structure-borne acoustic vibrations in pulse detector 39, it being possible to determine—according to the present invention—the impact points of harvested grains 14 that strike pulse detector 39 via structure-borne acoustic vibrations 42 detected by pulse detector 39 and, based on these points of impact, to determine, across the working width of upper sieve 25, the separation of a sieve loss 33 that does not fall through upper sieve 25.

A second pulse detector 37 can be located below upper sieve 25 in tailings region 36 in order to determine, across the working width of upper sieve 25, the separation of sieve pass-through 32 that falls through sieve openings 34 in upper sieve 25. A further pulse detector 38 can be located below second pulse detector 37 at the end of lower sieve 26, with which a separation of a sieve overflow 40 conveyed via lower sieve 26 and/or sieve pass-through 32 that falls through sieve openings 34 of upper sieve 25 is determined across the working width of lower sieve 26.

Figure 2:
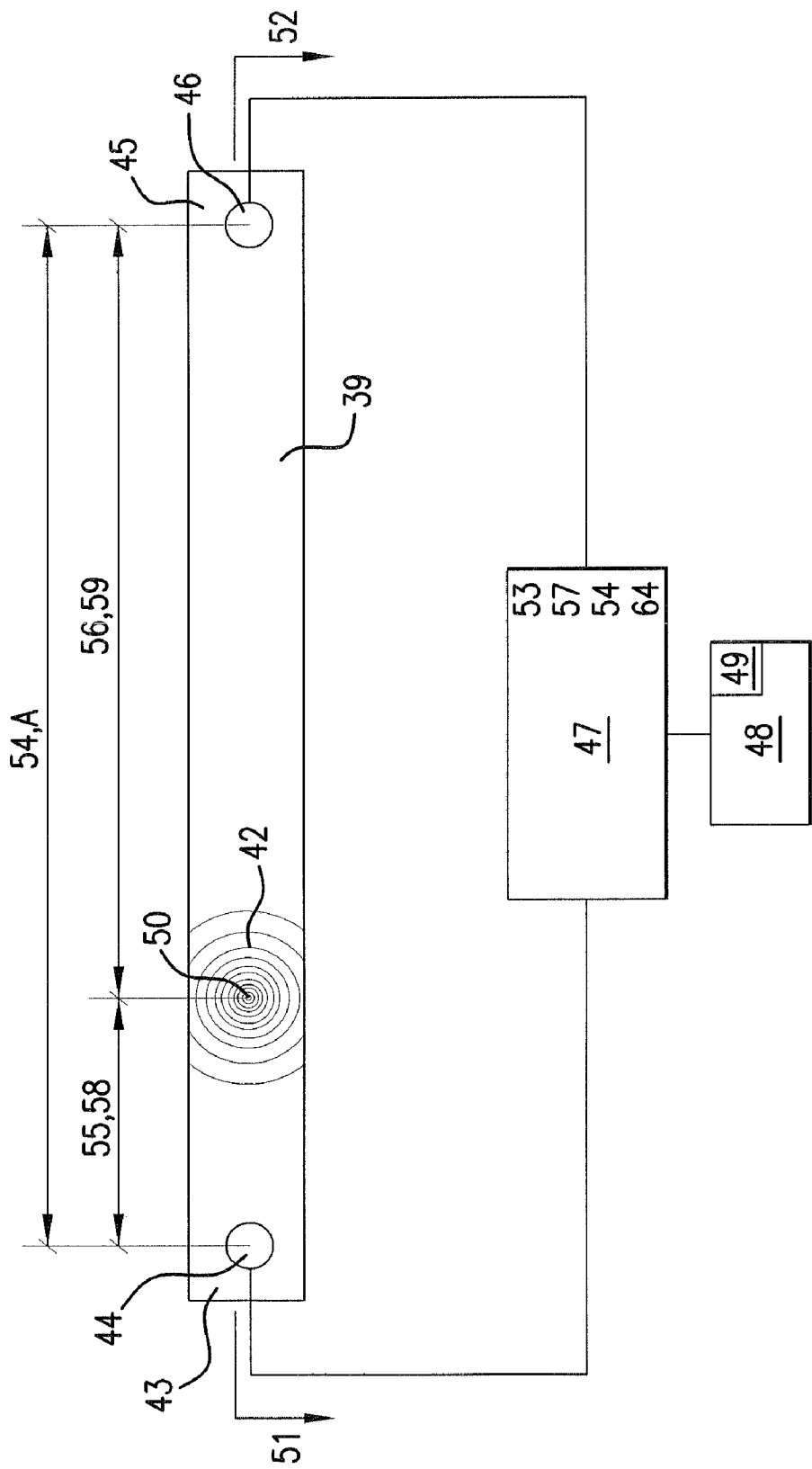
FIG. 2 shows the inventive device for the detection of at least one structure-borne acoustic vibration in a component of the combine harvester.

FIG. 2 shows a schematized depiction of an inventive device for the detection of at least one structure-borne acoustic vibration 42 in pulse detector 39 of the self-propelled harvesting machine. The device is composed of a first structure-borne sound sensor 44 located on an end 43 of pulse detector 39, and a further structure-borne sound sensor 46 located on a second end 45 of pulse detector 39, structure-borne sound sensors 44, 46 being separated by a distance 54, A. Structure-borne sound sensors 44, 46 are connected with a control and evaluation unit 47, to which a timer 48 is connected. Timer 48 is used to determine a transit-time difference 49 of a structure-borne acoustic vibration 42 that is received by first structure-born sound sensor 44 and second structure-born sound sensor 46 in a time-shifted manner. Control and evaluation unit 47 determines—according to the present invention and as a function of measured transit-time difference 49—source 50 of structure-borne acoustic vibration 42, which is identical to the point of impact of a harvested grain on a pulse detector 37, 38, 39.

An inventive method for the detection of at least one structure-borne acoustic vibration 42 is described below.

Control and evaluation unit 47 monitors sound pressures 51, 52 of structure-borne acoustic vibration 42 received by structure-borne sound sensors 44, 46. The determination of transit-time difference 49 is started at a point in time when neither of the two structure-borne sound sensors 44, 46 receives a structure-borne acoustic vibration 42. Control and evaluation unit 47 compares sound pressures 51, 52 of structure-borne acoustic vibration 42 received by structure-borne sound sensors 44, 46 with a peak sound pressure 53 stored in control and evaluation unit 47. If sound pressures 51, 52 are below peak sound pressure 53, the determination of transit-time difference 49 is halted and timer 48 is reset. When sound pressures 51, 52 exceed peak sound pressure 53, the determination of transit-time difference 49 is continued.

Timer 48 for measuring transit-time difference 49 is started as soon as, e.g., first structure-borne sound sensor 44 receives structure-borne acoustic vibration 42, and it is halted as soon as further structure-borne sound sensor 46 also receives structure-borne acoustic vibration 42.

Timer 48 is also started as soon as further structure-borne sound sensor 46 receives structure-borne acoustic vibration 42, and it is stopped when first structure-borne sound sensor 44 also receives structure-borne acoustic vibration 42. Control and evaluation unit 47 compares the time measured by timer 48 with a maximum possible transit time 54 stored in control and evaluation unit 47. The determination of transit-time difference 49 is halted when the time measured reaches the maximum possible transit time 54.

If first structure-born sound sensor 44 receives acoustic vibration 42 before further structure-borne sound sensor 46 (see FIG. 2), control and evaluation unit 47 calculates—based on measured transit-time difference 49 and maximum possible transit time 54—a transit time 55 required by structure-borne acoustic vibration 42 to travel from its source 50 to first structure-borne sound sensor 44. Transit time 55 is half the difference between maximum possible transit time 54 and transit-time difference 49.

Instead of this, control and evaluation unit 47 can also calculate a transit time 56 based on measured transit-time difference 49 and specified maximum possible transit time 54 that is required by acoustic vibration 42 to travel from its source 50 to second structure-borne sound sensor 46.

If, in a subsequent measurement, further structure-born sound sensor 46 receives acoustic vibration 42 before first structure-borne sound sensor 44 (see FIG. 3), control and evaluation unit 47 calculates—based on measured transit-time difference 49 and maximum possible transit time 54—a transit time 60 required by structure-borne acoustic vibration 42 to travel from its source 50 to further structure-borne sound sensor 46. Transit time 60 is half the difference between maximum possible transit time 54 and transit-time difference 49. As an alternative, control and evaluation unit 47 can also calculate—based on measured transit-time difference 49 and specified maximum possible transit time 54—a transit time 61 required by acoustic vibration 42 to travel from its source 50 to first structure-borne sound sensor 44.

Control and evaluation unit 47 calculates—based on transit-time differences 55, 56, 60, 61 and a sound velocity 57 stored in control and evaluation unit 47—distances 58, 59, 62, 63 between source 50 of acoustic vibration 42 and corresponding structure-borne sound sensor 44, 46, a distance 58, 59, 62, 63 unambiguously indicating source 50 of structure-borne acoustic vibration 42 on pulse detector 39. It is also possible for control and regulating device 47 to unambiguously determine distances 58, 59, 62, 63 of source 50 of acoustic vibration 42 only via the relationship of transit-times 55, 56, 60, 61 to maximum possible transit time 54. Transit times 55, 56, 60, 61 and associated distances 58, 59, 62, 63 are proportional to each other, since sound velocity 57 is constant.

Distances 58, 59, 62, 63 of source 50 of structure-borne acoustic vibrations 42 to structure-borne sound sensor 44, 46 are stored in control and evaluation unit 47 in a time-dependent manner. Based on the stored data, control and evaluation unit 47 determines the transverse distribution of sources 50 of structure-borne acoustic vibrations 42 across the width of pulse detector 39, for a specifiable time period, the width corresponding to the transverse distribution of impact points across the width of pulse detector 39 resulting from harvested grains striking pulse detector 39 in succession.

Figure 3:
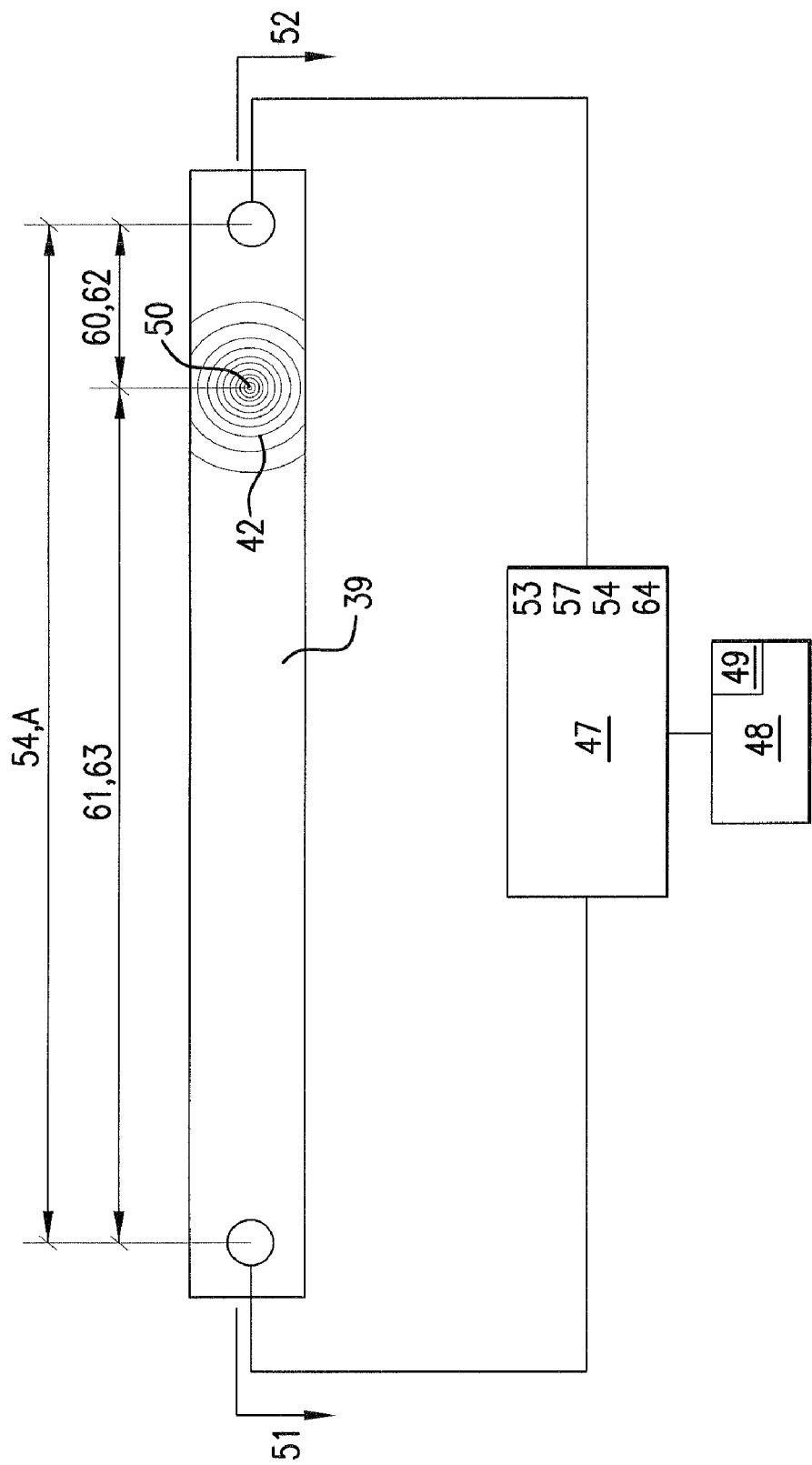
FIG. 3 shows the component of the combine harvester with an acoustic vibration that is received initially by the further structure-borne sound sensor.

The sound pressures are received by the structure-borne sound sensors and represented as signals 51, 52 respectively, in FIGS. 2, 3. A sum of the two sound pressures, or signals is compared with a representative limiting sound pressure 64 in control and evaluation unit 47 to determine whether acoustic vibration 42 was triggered by harvested grains striking the pulse detector and not a non-grain component striking a structure-borne sound sensor 44, 46 directly.

In control and evaluation unit, sound pressures represented by signals 51, 52 and derived of several structure-borne acoustic vibrations 42 that have the same source 50 are detected by a structure-borne sound sensor 44, 46. The signals are compared with each other to determine whether pulse detector 37, 38, 39 is contaminated and, as a result, dampens acoustic vibrations 42 to a greater extent than clean pulse detector 37, 38, 39.

When the dampening of the structure-borne acoustic vibration 42 remains constant, it is possible to deduce the properties of the element triggering structure-borne acoustic vibration 42 via a comparison carried out by pulse detector 37, 38, 39 of sound pressures 51, 52 of several structure-borne acoustic vibrations 42 that have the same source and that are detected by a structure-borne sound sensor 44, 46.

It is within the scope of the ability of one skilled in the art to modify the exemplary embodiments described in a manner not presented, or to use them in other machines to achieve the effects described, without leaving the framework of the invention.

It will be understood that each of the elements described above, or two or more together, may also find a useful application in other types of methods and constructions differing from the types described above.

While the invention has been illustrated and described as embodied in a device and a method for the detection of structure-borne acoustic vibrations, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for detecting at least one structure-borne acoustic vibration in a component of an agricultural harvesting machine, comprising the steps of determining a transit-time difference of a structure-borne acoustic vibration that is received by a pulse detector, the pulse detector comprising at least a first structure-borne sound sensor adapted for identifying harvested grains striking the pulse detector and at least a second structure-borne sound sensor adapted for identifying harvested grains striking the pulse detector using a timer; based on the transit-time difference, determining a source of the structure-borne acoustic vibration; using the transit-time difference and a specified maximum possible transit time to calculate at least one transit time required by the structure-borne acoustic vibration to travel from the source until said vibration is received by the first structure-borne sound sensor or by the second structure-borne sound sensor; using the calculated transit time and a specific sound velocity to calculate a distance between the source of the structure-borne acoustic vibration and the first or the second structure-borne sound sensor; and using the distance as an indication of the source of the acoustic vibration in the component.

2. A method as defined in claim 1; and further comprising starting the timer as soon as one of the structure-borne sound sensors receives the structure-borne acoustic vibration; and stopping the timer as soon as both structure-borne sound sensors receive the structure-borne acoustic vibration.

3. A method as defined in claim 1; and further comprising starting the timer when a sound pressure signal representative of the structure-borne acoustic vibration exceeds a specified peak sound pressure value.

4. A method as defined in claim 1; and further comprising halting the determination of the transit-time difference when the transit-time difference measured by the timer reaches or exceeds a maximum possible transit time.

5. A method as defined in claim 1; and further comprising halting the determination of the transit-time difference and resetting the timer when a sound pressure of the structure-borne acoustic vibration fails below a specified peak sound pressure.

6. A method as defined in claim 1; and further comprising storing the distance between the source of the structure-borne acoustic vibration and the structure-borne sound sensors, in a control and evaluation unit, with a point in time of the determination of the difference.

7. A method as defined in claim 6; and further comprising determining by the control and evaluation unit a distribution of the source of the structure-borne acoustic vibration in the component for a specifiable time period.

8. A method as defined in claim 1; and further comprising starting the determination of the transit-time difference when the structure-borne sound sensors stop receiving a structure-borne acoustic vibration.

9. A device for detecting at least one structure-borne acoustic vibration in a pulse detector component of an agricultural harvesting machine, the pulse detector component comprising at least a first structure-borne sound sensor adapted for identifying harvested grains striking the pulse detector and at least a second structure-borne sound sensor adapted for identifying harvested grains striking the pulse detector arranged for measuring a structure-borne acoustic vibration; at least one timer for determining the transit-time difference of the structure-borne acoustic vibration received by the first structure-borne sound sensor and the second structure-borne sound sensor; means for using the transit-time difference and a specified maximum possible transit time to calculate at least one transit time required by the structure-borne acoustic vibration to travel from the source until said vibration is received by the first structure-borne sound sensor or by the second structure-borne sound sensor; and means for determining a source of the structure-borne acoustic vibration based on the transit-time difference by using the calculated transit time and a specific sound velocity to calculate a distance between the source of the structure-borne acoustic vibration and the first or the second structure-borne sound sensor, and using the distance as an indication of the source of the acoustic vibration in the component.

10. A device as defined in claim 9, wherein said means include a control and evaluation unit for determining the source of the structure-borne acoustic vibration based on the transit-time difference.

11. A device as defined in claim 9, wherein said first structure-borne sound sensor is located on the pulse detector component at a distance between said second structure-borne sound sensor.

12. A device as defined in claim 9, wherein said structure-borne sound sensors are located on ends of the pulse detector component.

13. A device as defined in claim 10, wherein said structure-borne sound sensors are connected with said control and evaluation unit.

14. A device as defined in claim 10, wherein said control and evaluation unit is connected with said timer.

15. An agricultural harvesting machine configured as a combine harvester, comprising a pulse detector for determining a separation of a stream of crop material; and a device for detecting at least one structure-borne acoustic vibration in said pulse detector of the combine harvester, said device including at least a first structure-borne sound sensor adapted for identifying harvested grains striking the pulse detector and at least a second structure-borne sound sensor adapted for identifying harvested grains striking the pulse detector arranged for measuring a structure-borne acoustic vibration, at least one timer for determining the transit-time difference of the structure-borne acoustic vibration received by the first structure-borne sound sensor and the second structure-borne sound sensor, means for using the transit-time difference and a specified maximum possible transit time to calculate at least one transit time required by the structure-borne acoustic vibration to travel from the source until said vibration is received by the first structure-borne sound sensor or by the second structure-borne sound sensor; and means for determining a source of the structure-borne acoustic vibration based on the transit-time difference by using the calculated transit time and a specific sound velocity to calculate a distance between the source of the structure-borne acoustic vibration and the first or the second structure-borne sound sensor, and using the distance as an indication of the source of the acoustic vibration in the component.

16. An agricultural harvesting machine as defined in claim 15, wherein said pulse detector extends over a working width of a working unit of the combine harvester and detects a point of impact of harvested grains in a direction of the working width of the working unit.

17. An agricultural harvesting machine as defined in claim 15, wherein said means for determining include a control and evaluation unit which is configured for comparing a sum of values representative of two sound pressures produced in the structure-borne sound sensors with a value representative of a limiting sound pressure.

18. An agricultural harvesting machine as defined in claim 15, wherein said means for determining include a control and evaluation unit which is configured for comparing signals representative of sound pressures derived from at least two structure-borne acoustic vibrations that have a same source and that are detected by said structure-borne sound sensors, and by comparing the signals representative of the sound pressures, determining by said pulse detector a greater dampening of the structure-borne acoustic vibrations.

19. An agricultural harvesting machine as defined in claim 18, wherein said pulse detector is configured so that when the dampening of the structure-borne acoustic vibrations remains constant, the pulse detector compares signals representative of the sound pressures of at least two structure-borne acoustic vibrations that have the same source and that are detected by the structure-borne sound sensors.

* * * * *